United States Patent
Clemens et al.

(10) Patent No.: US 8,462,619 B2
(45) Date of Patent: Jun. 11, 2013

(54) SYSTEMS AND METHODS FOR PROVIDING FAULT DETECTION AND MANAGEMENT

(75) Inventors: Joseph R. Clemens, Coppell, TX (US); David L. Woodling, Denton, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 258 days.

(21) Appl. No.: 12/635,372

(22) Filed: Dec. 10, 2009

(65) Prior Publication Data
US 2011/0141913 A1   Jun. 16, 2011

(51) Int. Cl.
*H04J 3/14* (2006.01)
(52) U.S. Cl.
USPC .......................................... 370/216; 709/224
(58) Field of Classification Search
USPC .............. 370/216–219, 229–235, 236, 236.1, 370/236.2, 241.1, 242, 253; 709/223–226, 709/232, 244; 729/1–21; 726/1–21
See application file for complete search history.

(56) References Cited

U.S. PATENT DOCUMENTS

| | | | |
|---|---|---|---|
| 5,949,976 A * | 9/1999 | Chappelle | 709/224 |
| 6,289,379 B1 * | 9/2001 | Urano et al. | 709/223 |
| 2002/0103900 A1 * | 8/2002 | Cornelius et al. | 709/224 |
| 2002/0169866 A1 * | 11/2002 | Lim et al. | 709/223 |
| 2003/0023716 A1 * | 1/2003 | Loyd | 709/224 |
| 2006/0179134 A1 * | 8/2006 | Shemesh et al. | 709/223 |
| 2007/0266148 A1 * | 11/2007 | Ruiz et al. | 709/224 |
| 2008/0181100 A1 * | 7/2008 | Yang et al. | 370/216 |

\* cited by examiner

*Primary Examiner* — Jeffrey M Rutkowski
(74) *Attorney, Agent, or Firm* — Hartman & Citrin LLC

(57) ABSTRACT

Methods and systems for providing fault detection and management are disclosed. A system includes a web-based interface that allows a user to access all elements of a customer service network, which spans multiple networks, departments, and external partners. The system, and thereby the user, is able to manage almost all aspects of the network, thereby giving the user end-to-end customer experience issue management. Real time and archived events are utilized, in some embodiments, for root cause analysis and/or process and/or performance improvement. Events from differing transport, platform, technology and OSI model levels are correlated for optimal customer experience monitoring alarming and analysis.

17 Claims, 7 Drawing Sheets

SYSTEMS AND METHODS FOR PROVIDING FAULT DETECTION AND MANAGEMENT

BACKGROUND

This application relates generally to communications networks. More specifically, the disclosure provided herein relates to methods and systems for providing fault detection and management in communications networks.

The complexity and prevalence of communications networks, systems, and associated services have increased over the past several years. Many new applications are increasingly complex in terms of the resources required to operate and deliver the applications, the application functions, and storage architecture, for example. The resources necessary to conceive, develop, activate, and eventually to provide increasingly complex applications continue to increase.

In addition to the increasing complexity of applications and services, there is increased demand for applications and services that traverse various network technologies and systems. Thus, a particular service may involve multiple operations support systems (OSS) and business support systems (BSS) to function on a network. For example, users are becoming increasingly reliant upon network-based applications and services, as well as native applications on portable and fixed devices such as IPTV, voice and data services, mobile services, and the like. Many networks and network devices that provide these services are provided by, and in some cases operated by, a network operator, a third party, and/or various entities and can operate and function in dissimilar ways.

From a network management standpoint, these various networks and network devices often report operational information in different ways. For example, the networks and network devices may employ particular network management approaches and technologies for monitoring operation of the network system, and network management personnel associated with particular networks and network devices may rely upon specific, and varied, network management systems and methods. Furthermore, modern networks increasingly rely upon third party vendors to provide hardware and/or software for offered services. These hardware and software devices frequently operate and report according to systems, methods, and even protocols that are not the same as the network providing the services.

SUMMARY

The present disclosure is directed to systems and methods for providing fault detection and management. The system includes, in some embodiments, hardware and software that provide a network management system. The network management system includes a web-based interface that allows single signon and authentication, and that is configured to gather and display network management data for all levels of management of a communications network. The web-based interface and display is provided as one or more customizable web page displays that are customized based upon user permissions and responsibilities. Each level item displayed on the primary interface, for example a network system or subsystem, can be selected for successive detailed display of another level of information until a final level is reached. A user is thereby enabled to view the network from a top-down management view that may include a single binary status indicator for a complex system, to detailed operation characteristics of a particular system, subsystem, component, subcomponent, or the like, wherein all network components are viewable at an operational level.

The initial level of the display also may be grouped by function for a user, for example, the user's responsibilities, group, department, title, pay grade, and the like. These attributes are assigned by system or may be defined by a system administrator. The framework chosen to provide the primary display allows for multiple tools from differing sources to interact within the framework and allows all network elements to report to, or for information relating to all network elements to be reported to, a single system that is configured to display the state of the network operator's customer experience for any provided services. The system is able to accommodate reporting and operational characteristic display for not only proprietary devices and tools, but also for "off the shelf" (OTS) devices and tools, such that the OTS and proprietary devices and tools may coexist within a network. The system thus provides end-to-end network monitoring and fault management, as described below.

In an exemplary embodiment of the present disclosure, data is gathered from network elements such as, for example, transport devices, interfaces, servers, transaction simulators, transaction generation devices, real time email correspondence, configurations, historical performance, contracts, corporate compliance requirements, SLA agreements, working level agreements, interface agreements and partner agreements to determine the binary state of any given service or sub-component of a service at any of the displayable detailed levels. A combination of hardware and software, described herein as a network management system, performs the data gathering and is able to gather data for standardized methodologies including SNMP, WMI, and OAM, as well as synthetic transactions, actual transactions, email correspondence, and/or customized proprietary methods. The system relies upon data gathering methodologies that ensure that the service monitoring does not interfere with the performance of the service being monitored.

The disclosed network management system provides real-time performance and capacity management of network elements. End-to-end transaction flows for transactions are captured by the system and each sub-component of the service system is queried for configuration data. Thus, actual transaction flows may be determined, and real-time access control list, firewall rule analysis and optimization, and other network permissions management with operator intervention are possible, though not necessarily required in all embodiments.

A library of configurations is acquired and maintained to provide standards to which a known working system may be constructed. This library is available to the network management system (NMS) to enable monitoring of network configuration changes. Network configuration changes may be analyzed, and if a configuration is noted, one or more notifications may be generated based upon the real or anticipated impact to the network, service, and/or service component being monitored for configuration changes. The network management system has the ability to correct network errors and to notify appropriate parties of steps taken to intervene. In some embodiments, the network management system is configured for auto-correction of some errors.

The network management system discovers, monitors, and expands data gathered about a system. The system interacts with operators to request permission to discover additional aspects of the network systems, subsystems, components, and interactions. The system constructs an inventory of assets utilized, affiliated, or connected to any of the network systems, subsystems, components, and/or subcomponents, and particular operational information associated with these devices and systems. Thus, the inventory of assets is not merely limited to descriptive information such as product numbers, model numbers, serial number, asset tags, and the like, and instead includes operational and configuration information that is tracked to ascertain performance characteristics at any particular time.

The network management system also is configured for data logging and "warehousing" to allow logging of all network events, errors, solutions, configurations, permissions, and the like, which may be logged and stored at multiple times. A hypermining engine of the system allows for dissimilar events or sequence of events to be pieced together to identify not only root causes, but also historical trends and performance information at almost any level a monitored system. The hypermining engine therefore may be used to develop operational guidelines for the network based upon historical trends and solutions to historical network errors.

According to an aspect, a computer-implemented method for managing a network includes computer-implemented operations for gathering, at a network management system, network operational data, storing the network operational data at a storage location associated with the network management system, analyzing the network operational data to identify a network error, and executing an action to correct the network error. In some embodiments, gathering the network operational data includes obtaining configuration data associated with a network element, and monitoring network traffic to obtain capacity data. Gathering the network operational data further includes retrieving a network operation rule, the network operation rule defining a fault condition for the network element, the fault condition for the network element including the network error, and analyzing the network operational data includes determining if the configuration data satisfies the rule, wherein the configuration data is determined to satisfy the rule if the configuration data indicates that the network element is operating in accordance with the fault condition.

In some embodiments, gathering the network operational data further includes retrieving a network operation rule, the network operation rule defining a fault condition for the network element, the fault condition for the network element including the network error, and analyzing the network operational data includes determining if the capacity data satisfies the rule, wherein the capacity data is determined to satisfy the rule if the capacity data indicates that the network element is operating at a capacity that violates a threshold defined by the rule. In some embodiments, gathering the network operational data further includes executing a synthetic transaction with a network element and monitoring a network device involved in the synthetic transaction. Monitoring the network device can include monitoring the network device to determine if the network device completes a portion of the transaction correctly. The network error can include a determination that the network device does not complete the portion of the transaction correctly.

In some embodiments, gathering the network operational data further includes monitoring a first network device and a second network device involved in a network transaction, the first network device including a device residing on the network and the second network device including a device in communication with the network, wherein the network error includes a determination that at least one of the first network device and the second network device does not complete a portion of the network transaction correctly. The method also can include obtaining configuration data associated with a network element, and comparing the configuration data to historical configuration data associated with the network element to determine if the configuration data and the historical configuration data are the same, the historical configuration data being stored at a data storage location associated with the network management system. The network error includes a determination that the configuration data and the historical configuration data are not the same.

Executing the action includes generating a notification and displaying the notification to a user of the network management system. The method also may include obtaining access control list data associated with a network element, and comparing the access control list data to historical access control list data associated with the network element to determine if the access control list data and the historical access control list data are the same, the historical access control list data being stored at a data storage location associated with the network management system. The network error includes a determination that the access control list data and the historical access control list data are not the same.

In some embodiments, the method further includes providing a web interface for controlling the network management system. A user is authenticated at the web interface and permissions are set for the user. The permissions can be set, at least in part, upon the authenticating. Permitted data is retrieved for the user and is displayed for the user.

According to another aspect, a system for managing a network includes a memory for storing computer executable instructions. The computer executable instructions include an alarm/alerting engine, an analysis engine, an inventory module, and a log file hypermining engine. The computer executable instructions are executable by a processor. Execution of the instructions by the processor make the system operative to gather, using the alarming/alerting engine, network operational data, store, at the inventory module, the network operational data, analyze, at the analysis engine, the network operational data to identify a network error, execute an action to correct the network error, and create an error log entry, the error log entry including data indicating the network error and the action executed to correct the network error.

In some embodiments, the alarm/alerting engine includes a synthetic transactions alerting engine. Execution of the synthetic transactions alerting engine makes the system operative to execute a synthetic transaction, the synthetic transaction being conducted between a network access device and a network element for providing a service, and to monitor the network access device and the network element involved in the synthetic transaction. The instructions for monitoring the network access device and the network element further include instructions, the execution of which makes the system operative to monitor the network access device and the network element to determine if the network access device and the network element complete a portion of the transaction correctly. The network error includes a determination that at least one of the network access device and the network element does not complete the portion of the transaction correctly.

In some embodiments, execution of the log file hypermining engine makes the system operative to store the log entry at the memory, the memory including a plurality of historical log entries, wherein each historical log entry includes data indicating a historical network error and an action executed to correct the historical network error, analyze the log entry and the plurality of historical log entries to determine a historical trend indicating network behavior over time, and generate a recommended network management rule based, at least partially, upon the historical trend and the network behavior. In some embodiments, the alarming/alerting engine includes a custom transactions monitors module, the execution of which makes the system operative to monitor a first network device and a second network device involved in a network transaction, the first network device including a device residing on the network and the second network device including a device in communication with the network, wherein the network error includes a determination, by the system, that at least one of the first network device and the second network device does not complete a portion of the network transaction correctly.

In some embodiments, execution of the instructions makes the system further operative to obtain configuration data associated with a network element, and compare the configuration data to historical configuration data associated with the network element to determine if the configuration data and the historical configuration data are the same. The historical configuration data can be stored at a data storage location associated with the network management system. The network error can include a determination that the configuration data and the historical configuration data are not the same.

In some embodiments, the computer executable instructions further include a web interface. Execution of the web interface makes the network management system operative to authenticate a user at the network management system and to set permissions for the user based, at least in part, upon the authenticating. The web interface retrieves permitted data for the user from the memory, and displaying the permitted data for the user.

According to another aspect, a computer-readable medium including computer-executable instructions, executable by a processor to provide a method for managing a network, the method including gathering, at a network management system, network operational data, storing the network operational data at a storage location associated with the network management system, analyzing the network operational data to identify a network error, executing an action to correct the network error, and creating an error log entry, the error log entry including data indicating the network error and the action executed to correct the network error.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing fault detection and management. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
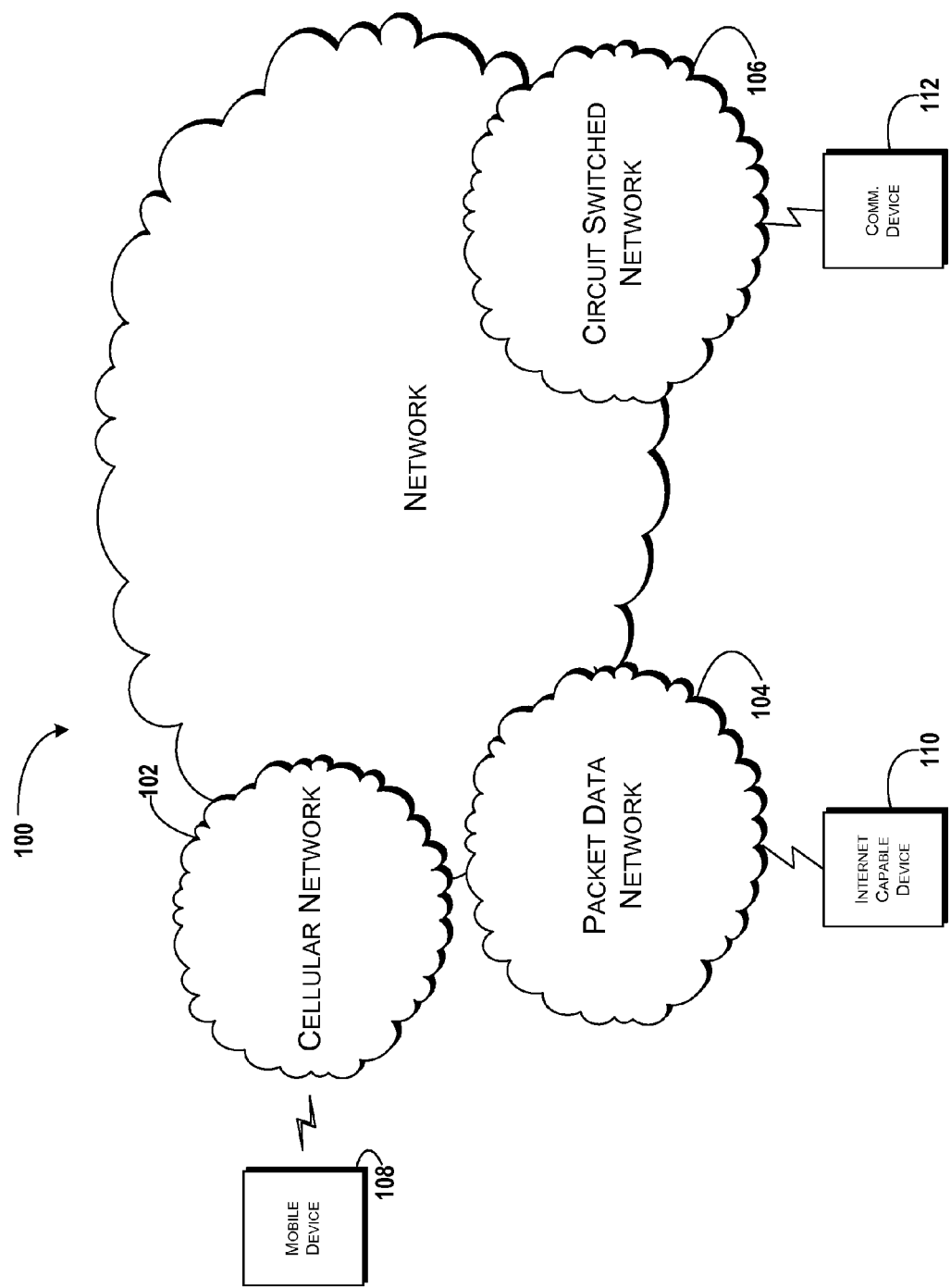
FIG. 1 schematically illustrates a network, according to an exemplary embodiment of the present disclosure.

Referring now to the drawings, in which like numerals represent like elements through the several figures, FIG. 1 schematically illustrates an exemplary network 100, according to an exemplary embodiment of the present disclosure. The network 100 includes a cellular network 102, a packet data network 104, for example, the Internet (Internet), and a circuit switched network 106, for example, a publicly switched telephone network (PSTN). The cellular network 102 includes various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, an Internet protocol multimedia subsystem (IMS), and the like. The cellular network 102 also includes radios and nodes for receiving and transmitting voice, data, and combinations thereof to and from radio transceivers, networks, the Internet 104, and the PSTN 106. A mobile communications device ("mobile device") 108, such as, for example, a cellular telephone, a user equipment, a mobile terminal, a PDA, a laptop computer, a handheld computer, and combinations thereof, can be operatively connected to the cellular network 102. The cellular network 102 can be configured as a 2G GSM (Global System for Mobile communications) network, and can provide data communications via GPRS (General Packet Radio Service) and EDGE (Enhanced Data rates for GSM Evolution). Additionally, the cellular network 102 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+(Evolved HSPA). The cellular network 102 is also compatible with future mobile communications standards including, but not limited to, pre-4G and 4G, for example.

The Internet 104 includes various devices, for example, servers, computers, databases, and other devices in communication with another, as is generally known. The Internet 104 devices are accessible via one or more network links The servers often store various files that are provided to a requesting device such as, for example, a computer, a terminal, a smart phone, or the like. Typically, the requesting device includes software (a "browser") for executing a web page in a format readable by the browser or other software. Other files and/or data may be accessible via "links" in the retrieved files, as is generally known. The PSTN 106 includes various hardware and software for providing circuit switched communications. The PSTN 106 may include, or may be, what is often referred to as a plain old telephone system (POTS). The functionality of a PSTN 106 or other circuit-switched network are generally known and will not be described herein in detail.

The illustrated cellular network 102 is shown in communication with the Internet 104 and a PSTN 106, though it should be appreciated that this is not necessarily the case. One or more Internet-capable devices 110, for example, a PC, a laptop, a portable device, the mobile device 108, a smart phone, or any other suitable device, can communicate with one or more cellular networks 102, and mobile devices 108 connected thereto, through the Internet 104. It also should be appreciated that the Internet-capable device 110 can communicate with the Internet 104 through the PSTN 106, the cellular network 102, and/or via other networks (not illustrated). As illustrated, a communications device 112, for example, a telephone, facsimile machine, modem, computer, or the like, can be in communication with the PSTN 106, and therethrough to the Internet 104 and/or the cellular network 102. It should be appreciated that the communications device 112 can be an Internet-capable device, and can be substantially similar to the Internet-capable device 110. In the specification, the network 100 is used to refer broadly to any combination of the networks 102, 104, 106. It should be appreciated that substantially all of the functionality described with reference to the network 100 can be performed by the cellular network 102, the Internet 104, and/or the PSTN 106, alone or in combination with other networks, network elements, and the like.

Figure 2:
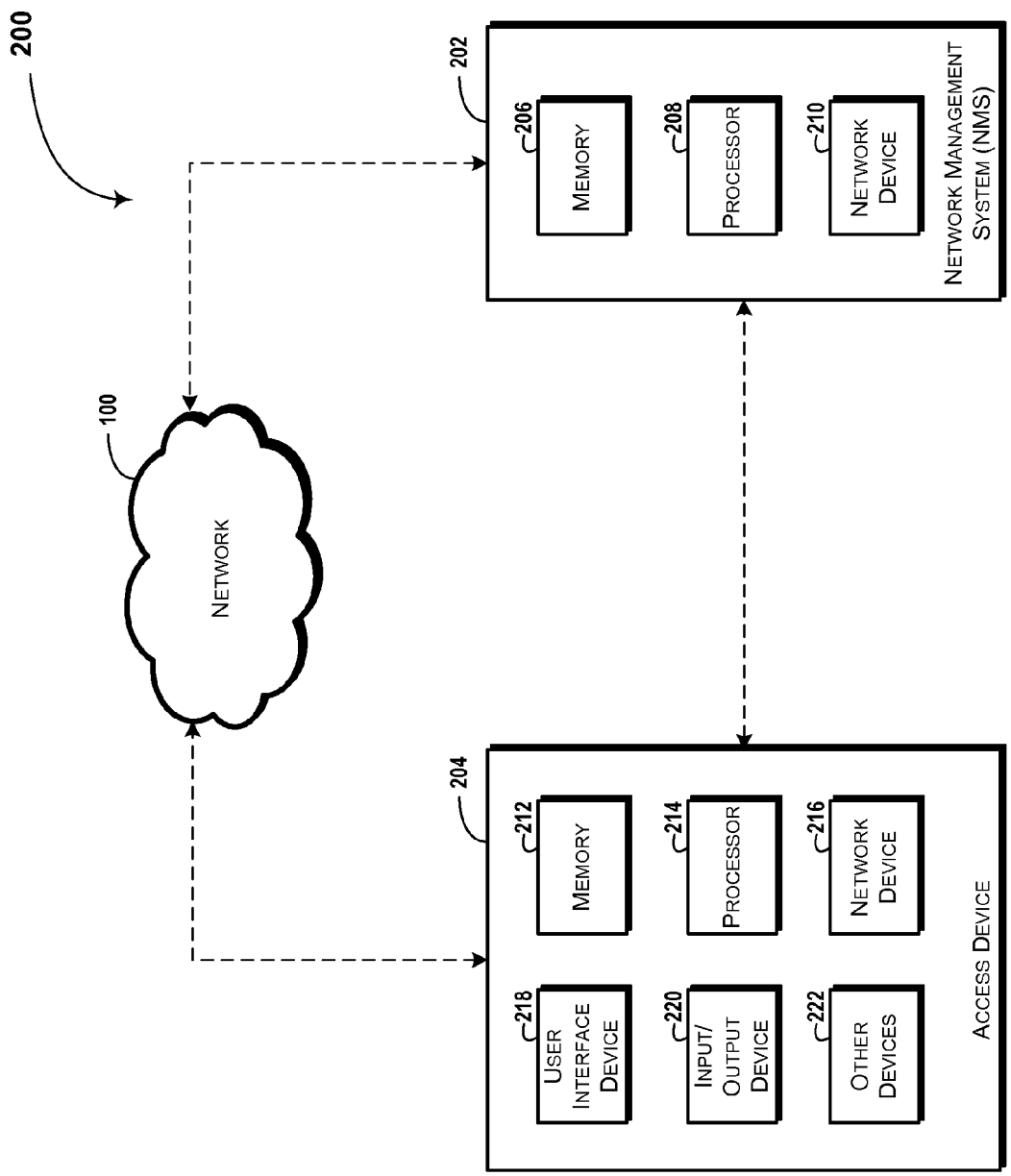
FIG. 2 schematically illustrates a system for providing fault detection and management, according to an exemplary embodiment of the present disclosure.

FIG. 2 schematically illustrates a system 200 for providing fault detection and management, according to an exemplary embodiment of the present disclosure. The system 200 includes a network management system 202 (NMS) and an access device 204. The NMS 202 and the access device 204 are configured to communicate with one another via a direct link and/or via the network 100. It should be appreciated that the functions of the NMS 202 and the functions of the access device 204 can be provided by a unitary device. The illustrated configuration, i.e., the NMS 202 and the access device 204 being separate devices, is provided for purposes of clarifying the description and is only one contemplated embodiment of the system 200 described herein. Thus, the configuration illustrated in FIG. 2 should be understood as exemplary of the concepts disclosed herein, and not as limiting the scope of this disclosure in any way.

The NMS 202 includes a memory 206, a processing unit 208 ("processor"), and a network device 210, each of which is operatively connected to a system bus (not illustrated) that enables bi-directional communication between the memory 206, the processor 208, and the network device 210. Although the memory 206, the processor 208, and the network device 210 are illustrated as unitary devices, some embodiments of the NMS 202 include multiple processors, memory, and network devices. The processor 208 may be a standard central processor that performs arithmetic and logical operations, a more specific purpose programmable logic controller ("PLC"), a programmable gate array, or other type of processor known to those skilled in the art and suitable for controlling the operation of the NMS 202. Processors are well-known in the art, and therefore are not described in further detail herein.

The memory 206 communicates with the processor 208 via the system bus. In some embodiments, the memory 206 is operatively connected to a memory controller (not shown) that enables communication with the processor 208 via the system bus. In some embodiments, the memory 206 includes an operating system and one or more program modules, as will be described below with reference to FIG. 3. Examples of operating systems include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system.

The network device 210 enables the NMS 202 to communicate with other networks or remote systems, for example, the network 100. Examples of the network device 210 include, but are not limited to, a modem, a radio frequency ("RF") or infrared ("IR") transceiver, a telephonic interface, a bridge, a router, and a network card. Thus, the NMS 202 is able to communicate with the network 100 and/or various components of the network 100 such as, for example, a Wireless Local Area Network ("WLAN") such as a WIFI® network, a Wireless Wide Area Network ("WWAN"), a Wireless Personal Area Network ("WPAN") such as a BLUETOOTH® device, a Wireless Metropolitan Area Network ("WMAN") such as a WIMAX® network, and/or the cellular network 102. Additionally or alternatively, the NMS 202 is able to access a wired network including, but not limited to, a Wide Area Network ("WAN") such as the Internet 104, a Local Area Network ("LAN") such as an intranet, and/or a wired Personal Area Network ("PAN"), or a wired Metropolitan Area Network ("MAN"). The NMS 202 also may access the PSTN 106.

Although the memory 206, the processor 208, and the network device 210 are illustrated as unitary devices, some embodiments of the NMS 202 include multiple processing, data storage, and communication devices. Furthermore, although the memory 206 is illustrated as residing at the NMS 202, it should be understood that the memory 206 may include a remote data storage device accessed by the NMS 202. In some embodiments, the memory 206 includes one or more databases communicatively linked with the NMS 202.

The access device 204 includes a memory 212, a processing unit 214 ("processor"), a network device 216, a user interface device 218, an input/output ("I/O") device 220, and other devices 222, each of which is operatively connected to a system bus (not illustrated) that enables bi-directional communication between the memory 212, the processor 214, the network device 216, the user interface device 218, the I/O device 220, and the other devices 222. Although the memory 212, the processor 214, and the network device 216 are illustrated as unitary devices, some embodiments of the NMS 202 include memory, processor, and network devices. The memory 212 is configured to store computer executable instructions for execution by the processor 214, as described above with reference to the NMS 202. The network device 216 allows the access device 204 to communicate with other network elements such as the NMS 202, and/or to communicate with the network 100. In some embodiments, the access device 204 includes a computer, a smart phone, a web-based interface device, a terminal, or another device for interfacing and/or controlling with the NMS 202.

The user interface device 218 may include one or more devices with which a user accesses the access device 204. The user interface device 218 may include, but is not limited to, a computer, a server, a personal digital assistant, a cellular phone, or any suitable computing device. The I/O device 220 enables a user to interface with the program modules stored in the memory 212. In one embodiment, the I/O device 220 is operatively connected to an I/O controller (not shown) that enables communication with the processor 214 via a system bus (not shown). The I/O device 220 may include one or more input devices, such as, but not limited to, a keyboard, a mouse, or an electronic stylus. Further, the I/O device 220 may include one or more output devices, such as, but not limited to, a display screen or a printer. The access device 204 also includes other devices 222. The other devices 222 may include one or more devices such as, but not limited to, a virtual server, a database, a hard disk drive (HDD), a disk drive array, e.g. a random array of independent disks (RAID), a billing system such as a credit card scanner and/or a merchant account management module, a streaming content server, a control module, combinations thereof, and the like.

In some embodiments, the NMS 202 and the access device 204 are combined into a single device. In such embodiments, the functions of the memory devices 206, 212, the processors 208, 214, and the network devices 210, 216, can be combined and can be performed by single or multiple memory, processing, and network devices. All such combinations are contemplated and are included in the scope of the claims.

Figure 3:
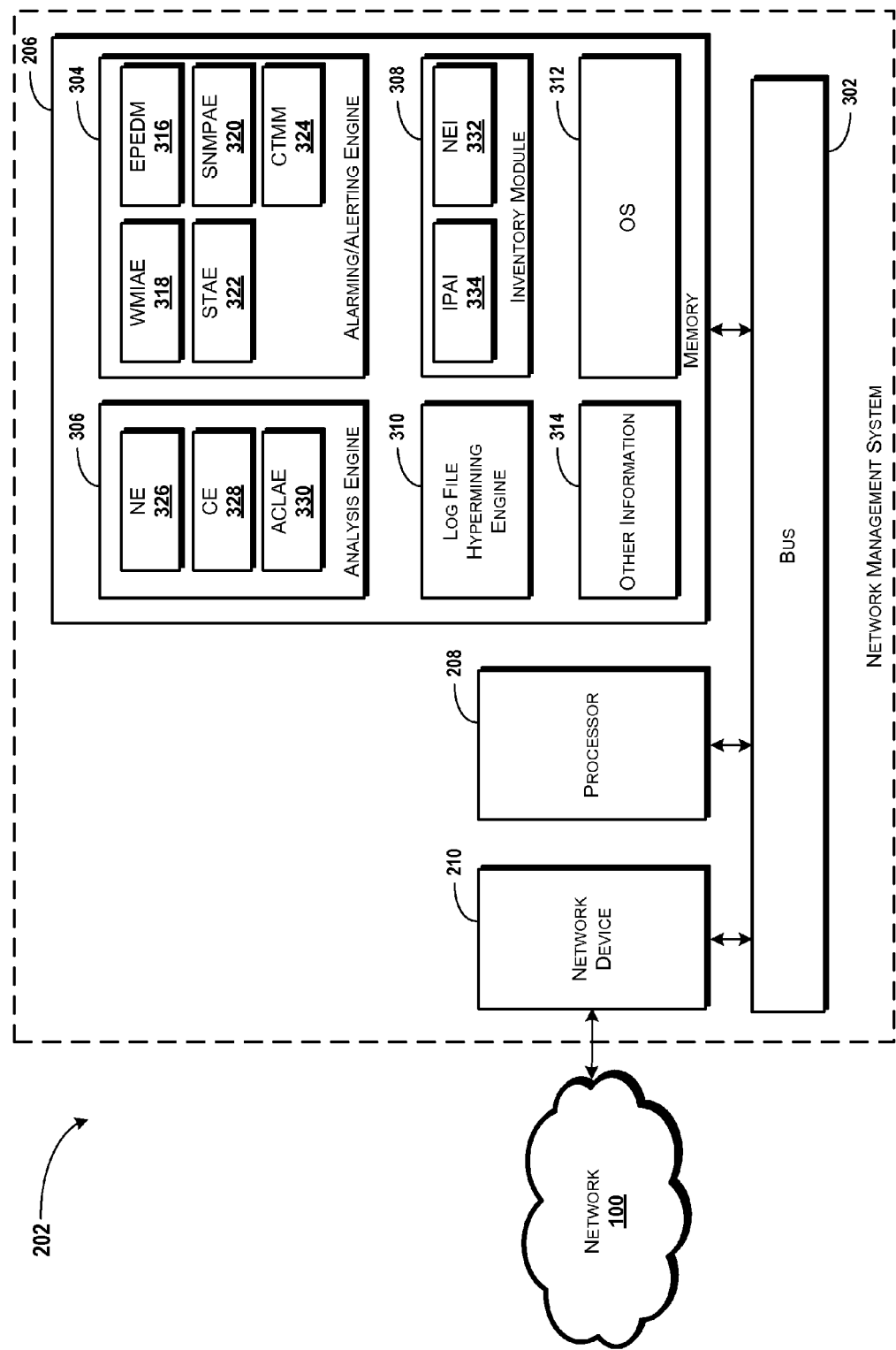
FIG. 3 schematically illustrates a network management system, according to an exemplary embodiment of the present disclosure.

FIG. 3 schematically illustrates the NMS 202, according to an exemplary embodiment of the present disclosure. As described above with reference to FIG. 2, the NMS 202 includes the memory 206, the processor 208, and the network device 210, each of which is communicatively linked via a system bus ("bus") 302. The NMS 202 is configured to communicate with the network 100 and/or the access device 204 via the network device 210. Although not illustrated in FIG. 3, the NMS 202 is configured in some embodiments to communicate with other networks and devices via the network device 210 or other network/device interfaces.

The memory 206 is configured for storing computer executable instructions that are executable by the processor 208. Upon execution of the computer executable instructions, the NMS 202 provides the functions described herein. While embodiments will be described in the general context of program modules that execute in conjunction with application programs that run on an operating system on the NMS 202, those skilled in the art will recognize that the embodiments may also be implemented in combination with other program modules. For purposes of clarifying the disclosure, the instructions are described as a number of program modules, or engines. It must be understood that the division of computer executable instructions into the illustrated and described program modules, engines, and other entities, may be conceptual only, and is done solely for the sake of conveniently illustrating and describing the NMS 202. In some embodiments, the memory 206 stores all of the computer executable instructions as a single program module. In some embodiments, the memory 206 stores part of the computer executable instructions and another system and/or data storage device stores other computer executable instructions. As such, it should be understood that the NMS 202 may be embodied in a unitary device, or may function as a distributed computing system wherein more than one hardware and/or software module provide the various functions described herein.

For purposes of this description, "program modules" include applications, routines, programs, components, software, software modules, data structures, and/or other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the NMS 202.

As illustrated, the NMS 202 includes an alarm/alerting engine 304 (AAE). The AAE 304 is executable by the processor 208 to provide data gathering functionality for the NMS 202. As illustrated in FIG. 3, the functions of the AAE 304 may be divided and/or distributed into or among a number of program modules, which may be referred to herein as "engines" and/or "modules," though this is not necessarily the case. In some embodiments, for example, the AAE 304 includes an External Partner Email Display Module 316 (EPEDM), a Windows Management Instrumentation Alerting Engine 318 (WMIAE), a Simple Network Management Protocol Alerting Engine 320 (SNMPAE), a Synthetic Transactions Alerting Engine 322 (STAE), and a Custom Transactions Monitors Module 324 (CTMM).

The EPEDM 316 is configured to collect, display, and/or extract data from electronic messages sent by external partners, e.g., an email pertaining or relating to an alarm. More particularly, the network 100 includes hardware and/or software devices provided by and/or operated by third parties. Some of these devices are not configured to communicate with the network 100 using communication protocols readily recognized by the network 100. For example, some devices are not configured to send alerts and/or reports to the network 100 in a recognizable format. As such, alerts, reports, and/or other communications associated with these devices are sent to the network 100 as, or appended to, electronic messages such as, for example, emails. The EPEDM 316 is configured to receive electronic messages associated with these devices. In some embodiments, the EPEDM 316 receives the messages directly from the devices. In further embodiments, the EPEDM 316 receives the messages from other network elements that receive the messages from the devices. Upon receipt of an electronic message, the EPEDM 316 is configured to parse the electronic message and/or to extract the alert, alarm, or other information from the electronic message and to convert the information into an alarm, alert, report, or other information recognizable by the network 100. As such, the EPEDM 316 is configured to receive an email or other electronic message, and to convert that email into an alert, alarm, report, or other instruction recognizable by the network 100.

The EPEDM 316 also is configured to store the extracted information in a data storage location associated with the NMS 202, for example, in the memory 206 or at another data storage device such as, for example, a database. In some embodiments, the EPEDM 316 stores the extracted information in a "library" such as, for example, an inventory module 308, or one or more modules associated with and/or included in the inventory module 308.

The WMIAE 318 is configured to interface with WINDOWS®-based network devices to generate and/or update a list of currently published alerts and alarms for all versions of the WINDOWS® operating system. The WMIAE 318 also is configured to store the list of alerts and alarms at a storage location, for example, the memory 206 or another data storage device associated with the NMS 202. The WMIAE 318 is configured to periodically update a comprehensive list of all currently published alerts and alarms associated with all WINDOWS®-based devices operating on the network 100. The WMIAE 318 is configured to connect to a WINDOWS®-based network device, for example, a WINDOWS® 2003 server, and obtains all alerts and alarms for that network device. The WMIAE 318 updates and/or compliments a list of all WMI alerts and alarms as needed, based upon the retrieved or received alerts and alarms data.

The WMIAE 318 also is operative to provide template based alarming setup to allow the NMS 202 to customize alarm conditions for WINDOWS®-based network devices. For example, the WMIAE 318 can combine multiple alarm states into a single alarm and/or create a custom alarm. For example, a first rule may define a network element activity threshold and a second rule may define a dropped packet threshold for the network element. If both conditions of the two rules are specified, a custom alarm may be determined by the WMIAE 318 to be satisfied, and an alarm condition can be determined to be present. The WMIAE 318 also can set and/or store individual and combined alarm threshold settings. Thus, the WMIAE 318 can be used to define alarm conditions for a single alarm and/or for multiple alarms. For example, the WMIAE 318 may define a rule that specifies a threshold for traffic at a network element. If traffic at the network element meets the threshold, the rule may be determined to be satisfied. The rule may specify one or more alarms, alerts, or other actions to be taken if the rule is satisfied. Additionally, the WMIAE 318 is configured to allow level failure combinations to trigger an alarm event. For example, the WMIAE 318 may define an alarm condition based upon multiple network conditions such as increased traffic flow at a first network element and steady or decreasing requests from a third network element. Such a condition may be interpreted by the WMIAE 318 as indicating that a second network element for handling the requests from a third network element has ceased functioning correctly and is in need of attention. This example is merely illustrative of the concepts described herein, and should not be viewed as limiting the scope of this disclosure or the claims in any way.

The SNMPAE 320 is configured to interface with LINUX®-based network devices or other SNMP devices to generate and/or update a list of currently published SNMP alerts and alarms. Thus, the SNMPAE 320 is configured to store and maintain all management information bases (MIB's) associated with the network 100. The MIB's are stored in the memory 206 and/or at another data storage location associated with the NMS 202. The SNMPAE 320 is configured to provide the list of alerts and alarms to a user for management. The user is thus able to update and/or delete MIB's within the SNMPAE 320 as needed. The SNMPAE 320 allows various alarming setup functions to be performed by the AAE 304 and/or the NMS 202. These alarming setup functions include, but are not limited to, combining multiple alarms into a single alarm, setting and/or changing individual and combined alarm threshold settings, and configuring the NMS 202 such that a level failure combination triggers an alarm event.

The STAE 322 allows a user to configure template based alarming setup for various elements of the network 100, despite disparate operating systems and/or protocols, for example, WMI and SNMP. The STAE 322 is configured to setup alarming templates for the WMIAE 318 and the SNMPAE 320, and can simulate transactions for end-to-end testing of the NMS 202. The STAE 322 also is configured to conduct synthetic transactions on the network 100 to verify network conditions and/or the ability of the network 100 to provide a particular transaction. To that end, the STAE 322 is configured to setup an anticipated transaction including all network connections and transfers needed to complete the transaction. In an exemplary synthetic transaction, the STAE 322 is configured to simulate a visual voicemail session for a mobile telephone. The STAE 322 generates a request for a data session. The request is sent to a node of the cellular network 102, for example a visual voicemail server, which initiates a PDP context with the requesting device. Upon authentication, the visual voicemail server transmits data to the requesting device, the data including visual voicemail data, i.e., voicemail message headers, envelope data, and audio files. When the visual voicemail data is successfully received at the requesting device, the STAE 322 is able to verify that the synthetic transaction, i.e., a visual voicemail message session, is being correctly provided by the network 100.

In another exemplary transaction, the STAE 322 logs into an account management system and changes a setting associated with a user account and/or user device. The STAE 322 then monitors whether the account and/or device change is reflected in the account and/or the device, and if so, how much time elapses before the account and/or device change is reflected in the account and/or device. Thus, the STAE 322 is configured to verify that another function of the network 100 is being correctly provided by the network 100. These two transactions are merely exemplary and are provided solely for purposes of illustrating the ability of the STAE 322 to interface with the network 100 and devices in communication with the network 100. The STAE 322 is configured to build and conduct various complex transactions for verifying almost any function of the network 100, thereby determining if the network 100 is functioning correctly and/or identifying errors in the functionality provided by the network 100. By using the STAE 322, the NMS 202 is able to monitor the customer experience, end-to-end, by conducting various transactions and testing the functionality of the network 100 during provisioning of the services requested during the synthetic transactions. Any errors identified by the STAE 322 are stored by the STAE 322 at the memory 206 or another data storage device and/or reported to the NMS 202 for action.

The CTMM 324 is configured to monitor network transactions to verify the functioning of the network 100 and/or how the network interfaces with external connections. The CTMM 324 is able to monitor transactions occurring in the network 100, as well as transactions during which third party devices and/or networks are involved. Thus, the CTMM 324 is able to ensure that functionality provided by third party networks and/or devices are provided to customers in a seamless and accurate manner, and that the services are provided as needed. In an exemplary transaction, the CTMM 324 monitors a request for a media file and transfer of the file to a receiving device. The CTMM 324 determines, for example, if the user is authorized to receive the file and/or if the user's account includes access to the transferred file, that the correct file is transferred to the receiving device, the transfer time for the file, and/or that the device receives appropriate permissions from the network 100 or the external connection. In another exemplary transaction, a third party has agreed to put specific data on a particular website. The CTMM 324 monitors a download of the page and determines if the specific data is on the website as agreed. These examples are merely illustrative of transactions that may be monitored by the CTMM 324 and should not be construed as being limiting in any way.

As mentioned above, the AAE 304, as a data gathering component of the NMS 202, gathers data from a wide variety of network elements. In some embodiments, the AAE 304 stores the gathered data at a storage location, for example the memory 206, a library such as the inventory module 308, or another data storage location at the NMS 202 or external to the NMS 202. In some embodiments, the AAE 304 passes the gathered data to another network element, for example another module of the NMS 202, for analysis, interpretation, error identification, and/or problem solving.

The NMS 202 also includes an Analysis Engine 306. The Analysis Engine 306 is operative to receive or retrieve data from the data gathering mechanisms of the NMS 202, which include in some embodiments the AAE 304, and to evaluate established rules based upon the received and monitored data to determine if the network 100 is functioning properly. The functions of the Analysis Engine 306 may be divided and/or distributed into or among a number of program modules, referred to herein as "engines," though this is not necessarily the case. In some embodiments, for example, the Analysis Engine 306 includes a Netflow Engine 326 (NE), a Correlation Engine 328 (CE), and an Access Control List Analysis Engine 330 (ACLAE).

The NE 326 is configured to evaluate network traffic at devices operating on the network 100 ("network elements") to determine traffic at the network elements and the capacity of the network elements. The NE 326 uses the capacity to identify capacity-based warnings. For example, the NE 326 is configured to recognize that a network element is operating at or near its maximum capacity threshold, which may be defined by a rule specifying the maximum capacity threshold. The NE 326 then identifies the capacity at the network element as satisfying a capacity alarm associated with the monitored network element and can report the alarm to another element of the NMS 202 for action. The NE 326 is capable of monitoring as many network elements as needed. In some embodiments, one or more NE's 326 monitors every network element of the network 100 to evaluate capacity of the network elements and to determine if any capacity-based alarms are appropriate at any particular time.

The CE 328 is configured to analyze individual alarms and to correlate those alarms with a particular device operating on the network 100 ("network element"). The CE 328 is configured to analyze the source of the alarms and the rules associated with the alarms to correlate the alarms to a network element that generated or caused the alarm to allow end-to-end root cause analysis of the alarm. As such, the CE 328 is configured to correlate an alarm to device information stored at the inventory module 308. Thus, the CE 328 is able to associate the alarm with a device as part of a root-cause analysis for the alarm at issue. In other words, the CE 328 determines what network device generated the alarm for purposes of identifying the network element that is creating the alert. The CE 328 also is configured to evaluate multiple events, e.g. multiple alarms, and to aggregate these events into one alarm associated with a device. For example, the CE 328 may use a rule such as the rules described above to determine if any particular network element(s) are malfunctioning. For example, as mentioned above, a rule may be defined based upon traffic at a first network element and a second network element, and requests received by a third network element. In this example, an increase in traffic at a first network element and steady or declining requests at a third network element may denote a malfunction at the second network element. As such, multiple states relating to multiple network elements, i.e., a traffic increase at the first network element and a steady or declining request rate at a third network element, may be correlated by the CE 328 and determined to indicate a malfunction at a single network element, e.g., the second node. This example is merely illustrative and should not be interpreted as limiting in any way.

The ACLAE 330 is configured to provide a detailed analysis of all permissions and access control lists associated with all network elements of the network 100. In the network 100, many of the network elements have associated permissions that define what entities may access functionality and/or change settings of the network elements. These permissions often are restricted by user and/or device. For example, a voicemail platform may include a permission for a telephone call or other communication that is routed to the voicemail platform by an authorized network switching device. Thus, the voicemail platform will not block communications with a call connected with the voicemail platform by the authorized network switching device, but may block communication attempts originating from other internal or external devices or systems. Permissions for network elements may be changed by request, though such changes are rare. Additionally, permissions may be changed, for example, during network management and expansion over time. In such cases, permissions for network element may be changed by accident, by a technician or operator involved with a different area of the network and unfamiliar with the area corresponding to the affected permission, may expire, or otherwise may be changed in a manner that makes the changes difficult to discover. Thus, errors may not be discovered until some time later when attempt to access the network element is made. A network operator or technician may search for a hardware malfunction only to discover the network device is operating correctly, unaware that a permission associated with the device has changed. Thus, the network operator or technician may be unable to determine the cause of the error and the network device will be unable to function correctly.

The ACLAE 330, therefore, is configured to consolidate access control lists for the network 100 and to identify when changes are made to an access control list. Because the ACLAE 330 maintains a comprehensive list of permissions, all permissions can be checked and verified and errors can more easily be identified that may be possible if troubleshooting a particular device, in which case one would need to locate and verify the permissions for that particular device. The ACLAE 330 is further configured to generate an alarm condition when an access control list is changed and/or a change is discovered, and to notify network personnel of a change. The ACLAE 330 is further configured to perform analysis and report on ACL consolidation, optimization, and compliance.

As mentioned above, the Analysis Engine 306, as a data analysis component of the NMS 202, receives or retrieves data from the network elements and/or the AAE 304. The Analysis Engine 306 analyzes the retrieved or received data to identify network problems and/or to generate and transmit notifications of the problems to a user of the NMS 202 and/or to other network elements or modules of the NMS 202.

The NMS 202 also includes the inventory module 308. The inventory module 308 is operative to store details of all elements of the network 100, rules associated with each element of the network 100, and addresses associated with each element of the network 100. The functions of the inventory module 308 may be divided and/or distributed into or among a number of program and/or storage modules, referred to herein as "inventories," though this is not necessarily the case. In some embodiments, for example, the inventory module 308 includes a Network Element Inventory 332 (NEI) and an IP Address Inventory (IPAI) 334.

The NEI 332 is configured to store configuration information for the network 100, including past and present configurations, thereby allowing network operators to "roll back" changes in the network including router and switching device settings. The NEI 332 is operative to store configurations and device data for servers, transport elements, and other devices. Furthermore, the NEI 332 is operative to identify configuration changes and/or errors in the network 100. In some embodiments, the NEI 332 determines and stores configurations of existing network equipment, including routers and switching devices. These configurations can be compared later to the network configuration existing at the later time. The configurations may be determined by querying the network elements for configuration information, or by using auto discovery methods that authorize the NMS 202 to discover essentially all information relating to the network 100. If the NEI 332 identifies a configuration error, the NEI 332 is operative to "push" updates to network elements, including LINUX® servers, WINDOWS® servers, routers, switching devices, and other network elements. Because the NEI 332 checks configurations for all network elements, the NEI 332 is able to discover configuration changes in a particular network element easier than may be possible by troubleshooting a particular network element and searching for a configuration change.

For example, if a silent intrusion of the network 100 occurs, a slight configuration change that may otherwise be unnoticeable may be discovered by the NEI 332 and used by the NEI 332 to generate an alarm. Because the configuration change is slight, the configuration change may go unnoticed if the NMS 202 was simply looking for malfunctions at the network element level. Instead, the NMS 202 examines the settings and configuration of the network element and is able to notice a difference between the present configuration and a stored configuration. Thus, the NEI 332, by detecting the configuration change, is able to decrease the likelihood that additional damage to the network 100 will be done by the intruder. This example is merely illustrative and should not be interpreted as being limiting in any way.

The IPAI 334 stores information relating to each element of the network 100 ("network element"). In some embodiments, for example, the IPAI 334 stores an IP address of each network element and monitors each network element for Internet control message protocol (ICMP) messages. In some embodiments, the IPAI 334 scans the network elements for ICMP messages relating to, for example, availability of network elements, network congestion, communication errors, data transit time, e.g., pinging of network hosts, combinations thereof, and the like. Because ICMP is a known protocol, the scanning of network elements for ICMP messages will not be further described herein. Because the IPAI 334 is scanning the network elements for errors, the IPAI 334 is able to see an error and pass an alert to the NMS 202 for action.

The NMS 202 also includes a Log File Hypermining Engine 310 (LFHE). In some embodiments, the LFHE 310 is implemented as a module of the NMS 202, as illustrated in FIG. 3, and in some embodiments, the LFHE 310 is implemented as, or as part of, a separate device. The LFHE 310 analyzes all data collected and reviewed by the NMS 202 to search for and identify trends and to provide near real-time network information. In some embodiments, The LFHE 310 is configured to develop and publish engineering and business rules reflecting network operations. The LFHE 310 is configured to centralize network element log collection, to centralize network alarm log collection, and to data mine the network element logs and the network alarm logs to search for and identify trends for root cause analysis. Thus, the LFHE 310 is able to optimize network configurations based upon error logs and alarm logs.

As explained above, the memory 206 stores an operating system ("OS") 312. The memory 206 also stores other information 314. The other information 314 may include, but is not limited to, data storage for the NMS 202, computer readable instructions corresponding to additional program modules, NMS 202 operating statistics, billing and/or charging modules, data caches, data buffers, authentication data, combinations thereof, and the like.

Figure 4:
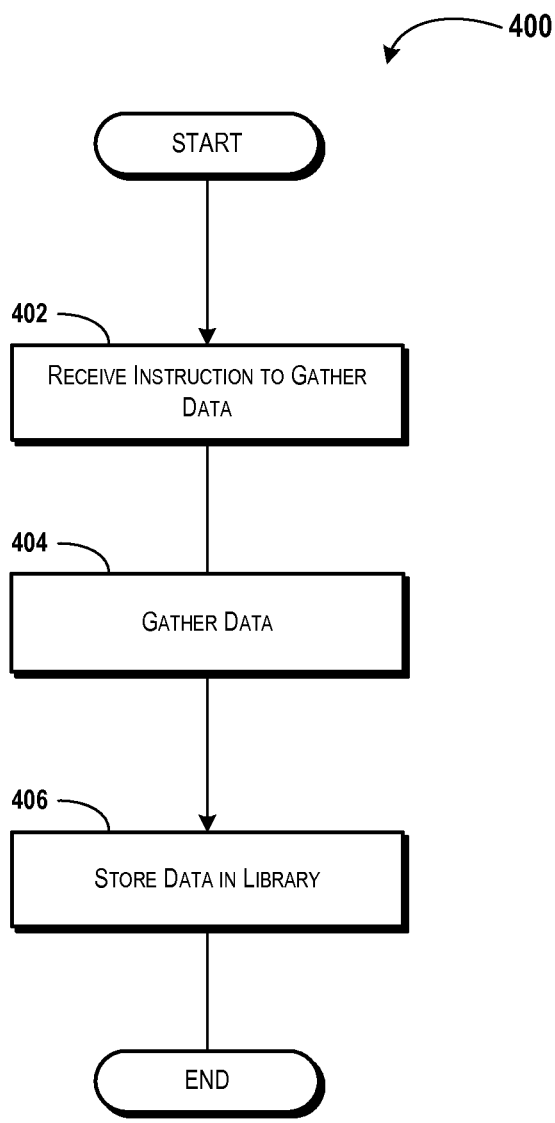
FIG. 4 schematically illustrates a method for gathering data for use in providing fault detection and management, according to an exemplary embodiment of the present disclosure.

FIG. 4 schematically illustrates a method 400 for gathering data for use in providing fault detection and management, according to an exemplary embodiment of the present disclosure. It should be understood that the operations of the method 400 are not necessarily presented in any particular order and that performance of some or all of the operations in an alternative order(s) is possible and is contemplated. The operations have been presented in the demonstrated order for ease of description and illustration. Operations may be added, omitted and/or performed simultaneously, without departing from the scope of the appended claims. It also should be understood that the illustrated method 400 can be ended at any time and need not be performed in its entirety.

Some or all operations of the method 400, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

The method 400 begins at operation 402, wherein the NMS 202 or a component thereof receives an instruction to gather data from the network 100. In some embodiments, the instruction to gather data is generated by the NMS 202, for example, by a program call or a trigger event. Exemplary trigger events include, but are not limited to, the satisfaction of a time condition, the completion of a data submission step at the NMS 202, the receipt of a command at the NMS 202, completion of a user logon at the NMS 202, and/or other trigger conditions. It should be understood that the NMS 202 may gather data as the data becomes available instead of, or in addition to, receiving an instruction to gather data. Therefore, the method 400 may proceed to, or begin with, operation 404.

At operation 404, the NMS 202 gathers data. In some embodiments, the NMS 202 executes one or more program modules stored in a memory 206 to gather the data. Execution of the one or more program modules makes the NMS 202 operative to gather data from the various network elements, as described above, particularly with reference to FIG. 3. In some embodiments, the NMS 202 gathers data as the data becomes available or when the data is submitted. It should therefore be understood that the data gathering may occur frequently. At any particular time in the network 100, one or more network elements may receive or gather data. As such, the data gathering may occur in a substantially continuous manner. As explained above with reference to FIG. 3, the data gathering includes querying and/or receiving configuration data associated with network elements, permissions associated with each of the network elements, scanning for ICMP messages, capturing transaction flows, performing and/or monitoring synthetic and actual transactions, examining network element performance and capacity, evaluating network traffic, receiving and parsing electronic messages, other actions, combinations thereof, and the like.

The method proceeds to operation 406, wherein the NMS 202 stores the gathered data at a data storage location. In some embodiments, the data storage location includes a library, for example, the memory 206. More particularly, the NMS 202 may store the gathered data at the inventory module 308, the NEI 332, the IPAI 334, and/or another storage location. As mentioned above, the gathered data is stored, in some embodiments, at a database in communication with the NMS 202 or at another external data storage location. The method 400 ends.

Figure 5:
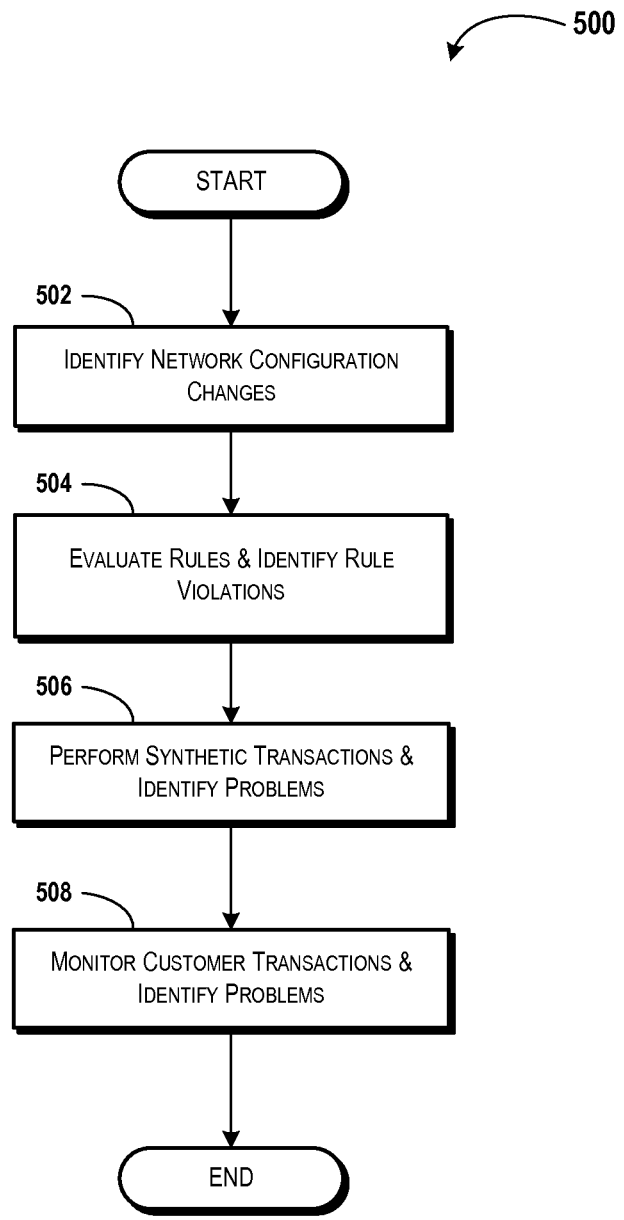
FIG. 5 schematically illustrates a method for detecting a network fault, according to an exemplary embodiment of the present disclosure.

FIG. 5 schematically illustrates a method 500 for detecting a network fault, according to an exemplary embodiment of the present disclosure. It should be understood that the operations of the method 500 are not necessarily presented in any particular order and that performance of some or all of the operations in an alternative order(s) is possible and is contemplated. The operations have been presented in the demonstrated order for ease of description and illustration. Operations can be added, omitted and/or performed simultaneously, without departing from the scope of the appended claims. It also should be understood that the illustrated method 500 can be ended at any time and need not be performed in its entirety. Some or all operations of the method 500, and/or substantially equivalent operations, can be performed by execution of computer-readable instructions included on a computer-storage media. The operations of the method 500 are provided, in some embodiments, by the NMS 202 or a component of the NMS 202 such as, for example, the Analysis Engine 306. In some embodiments, one or more program modules of the Analysis Engine 306, for example, the NE 326, the CE 328, and/or the ACLAE 330, are executable by the processor 208 to make the NMS 202 operable to perform the operations of the method 500. For the sake of clarity, the operations of the method 500 will be described as being performed by the NMS 202.

The method 500 begins at operation 502, wherein the NMS 202 examines the network configuration to search for network configuration changes. As explained above with reference to FIG. 3, the NEI 332 may store and analyze network configuration information, though other modules of the NMS 202 also may analyze the configuration information. In some embodiments, the NMS 202 reviews the current network configuration and compares the configuration to historical configuration information. During this comparison operation, the NMS 202 searches for and identifies differences between the current configuration and previous configurations. When a configuration difference is identified, the NMS 202 may flag the configuration change and may create an alarm or alert to prompt a network element or user to take corrective action.

The method 500 then proceeds to operation 504, wherein the NMS 202 evaluates rules to identify if any defined rules are violated or satisfied. The rules, as described above, can be created for almost any network condition and/or event. The rules relate, in some embodiments, to thresholds, levels, true or false values, and/or other data relating to network conditions. The network conditions include, but are not limited to, network traffic, capacity of one or more network elements, network element utilization, conditions at one or more network elements, operating characteristics of one or more network elements, other information, combinations thereof, and the like. If the NMS 202 identifies a rule that is satisfied and/or violated, the NMS 202 may flag the rule and the condition that violated or satisfied the rule, and may create an alarm or alert to prompt a network element or user to take corrective action.

The method 500 then proceeds to operation 506, wherein the NMS 202 evaluates synthetic transactions to identify any problems or issues. In some embodiments, the NMS 202 executes an STAE 322 or another program module to evaluate the synthetic transactions. As explained above, the synthetic transactions are created and monitored to effectively monitor, in an end-to-end fashion, transactions that mirror genuine user transactions. The synthetic transactions make use of various network elements, even across multiple networks, network platforms, and/or network protocols, to test true network functionality relating to particular transactions. In some instances, the synthetic transactions are as close to monitoring the customer experience as is possible in a proactive network management scheme. In some embodiments, the NMS 202 does not include the STAE 322, and the NMS 202 instead relies upon actual customer experiences, in a reactive fashion, to evaluate functionality of the network 100. By performing these synthetic transactions, the NMS 202 is able to identify problems with the network 100. If the NMS 202 identifies a problem with the network 100, the NMS 202 may flag the network element involved and the conducted transaction, and may create an alarm or alert to prompt a network element or user to take corrective action.

The method 500 then proceeds to operation 508, wherein the NMS 202 monitors customer transactions to identify any problems or issues. In some embodiments, the NMS 202 executes a CTMM 324 or another program module to monitor customer transactions. As explained above, the NMS 202 is configured to monitor extremely complex transactions that occur on and/or involve not only the network 100, but also, in some cases, external networks and/or third party devices. Thus, the NMS 202 is able to see how external providers are providing services at any particular time. By monitoring these transactions, the NMS 202 can identify network problems, either at the network 100 and/or at an external network or device. If the NMS 202 identifies any problems during the monitored transactions, the NMS 202 may flag the network element, the external device, the conducted transaction and/or the external network involved, and may create an alarm or alert to prompt a network element or user to take corrective action. As mentioned above, it should be understood that the operations of method 500 can be performed substantially continuously, and that the various operations described can be performed simultaneously. The method 500 ends.

Figure 6:
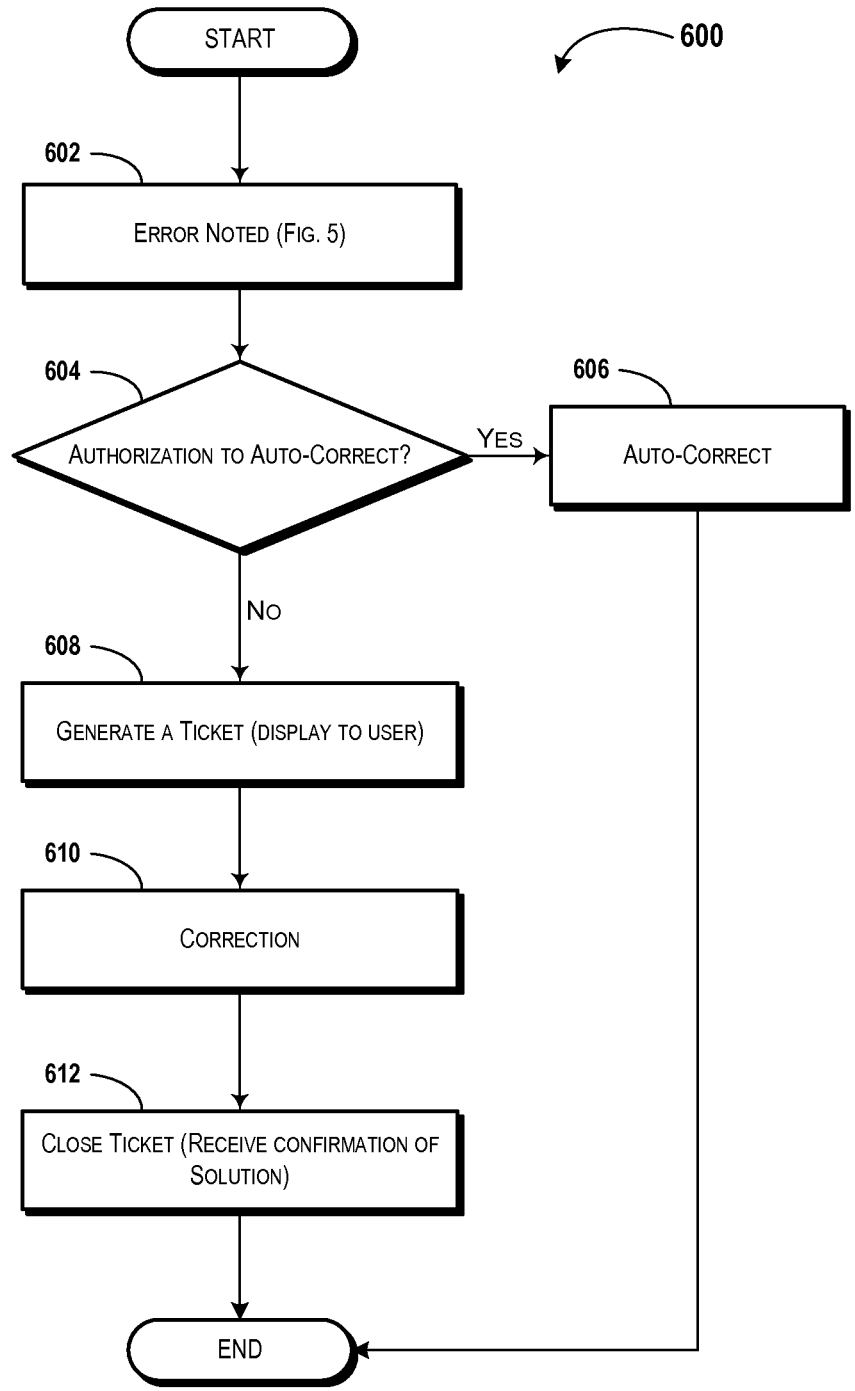
FIG. 6 schematically illustrates a method for correcting a network fault, according to an exemplary embodiment of the present disclosure.

FIG. 6 schematically illustrates a method 600 for correcting a network fault, according to an exemplary embodiment of the present disclosure. It should be understood that the operations of the method 600 are not necessarily presented in any particular order and that performance of some or all of the operations in an alternative order(s) is possible and is contemplated. The operations have been presented in the demonstrated order for ease of description and illustration. Operations can be added, omitted and/or performed simultaneously, without departing from the scope of the appended claims. It also should be understood that the illustrated method 600 can be ended at any time and need not be performed in its entirety. Some or all operations of the method 600, and/or substantially equivalent operations, can be performed by execution of computer-readable instructions included on a computer-storage media.

The method 600 begins at operation 602, wherein the NMS 202 identifies an error in the network 100, as described above with reference to the method 500 illustrated in FIG. 5. The method 600 then proceeds to operation 604, wherein the NMS 202 determines if the NMS 202 is authorized to auto-correct the error identified at operation 602. For example, the NMS 202 may be authorized to auto-correct certain types of errors and may not be authorized to auto-correct other types of errors. The determination as to when the NMS 202 is authorized to auto-correct errors is an operator management choice and may be reflected by a preference and/or program setting accessible by the NMS 202. It should be understood that the types of errors that the NMS 202 is authorized to auto-correct may change over time, as a network operator determines that certain types of errors reliably may be corrected without operator intervention. As the NMS 202 becomes a more mature part of the network 100, the network operator may designate additional types of error that may be automatically solved by the NMS 202. In one embodiment, the NMS 202 is authorized to correct basic operational errors, for example, minor configuration changes or other issues that do not affect overall network operations. In another embodiment, the NMS 202 is authorized to automatically correct configuration changes or other issues that affect overall network operations such as, for example, network element permissions. These examples, however, are merely exemplary. If the NMS 202 is authorized to auto-correct the error, the method proceeds to operation 606, wherein the NMS 202 auto-corrects the error.

It should be understood from the above examples and description that auto-correction of a network error may include, for example, changing network element permissions, changing network element operating characteristics, changing network element scheduling, rebooting network elements, turning on/off network elements, changing an IP address of a network element, powering up/down network elements, other actions, combinations thereof, and the like. The actions to take to auto-correct specific errors may be defined by a network operator, for example, a network engineer or other entity employed by the network operator, and may be based upon a historical problem solution and/or may be based upon an anticipated solution for problem. Additionally, or alternatively, the NMS 202 may determine how to auto-correct an error based upon recognizing how the error was caused and determining the logical steps needed to correct the error.

Returning briefly to operation 604, if the NMS 202 determines that the NMS 202 is not authorized to auto-correct the error, the method 600 proceeds to operation 608, wherein the NMS 202 generates a "ticket" for the network error. The generation of a "ticket" may prompt the NMS 202 or another element to notify network personnel that an error in the network 100 has been identified. Furthermore, the "ticket" may be put in queue for correction by an authorized entity, for example, by a technician. The "tickets" may be taken out of queue in a first-in, first-out (FIFO), last-in-first-out (LIFO), and/or priority- or severity-based scheme. The method 600 then proceeds to operation 610, wherein the error is corrected, as explained above. It should be understood that a considerable amount of time may lapse between the "ticket" generation and the error correction. The method 600 then proceeds to operation 612, wherein the NMS 202 closes the "ticket." In some embodiments, the NMS 202 closes the "ticket" only after receiving confirmation from authorized network personnel that the error has been corrected. The method 600 ends.

Figure 7:
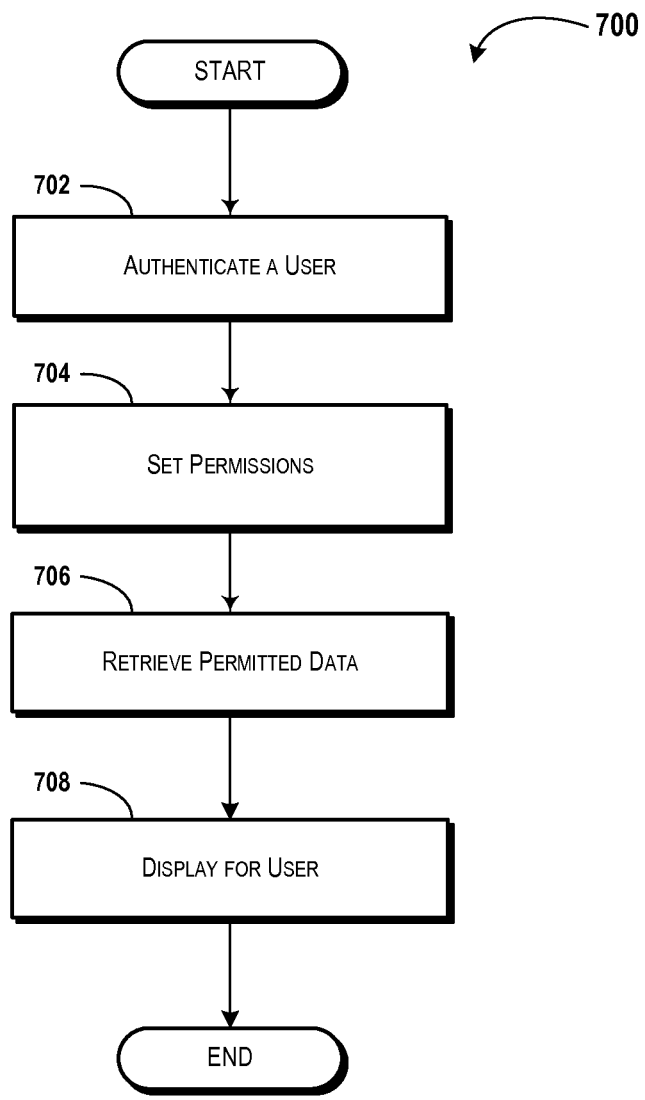
FIG. 7 schematically illustrates a method for accessing the network management system, according to an exemplary embodiment of the present disclosure.

FIG. 7 schematically illustrates a method 700 for accessing the NMS 202, according to an exemplary embodiment of the present disclosure. It should be understood that the operations of the method 700 are not necessarily presented in any particular order and that performance of some or all of the operations in an alternative order(s) is possible and is contemplated. The operations have been presented in the demonstrated order for ease of description and illustration. Operations can be added, omitted and/or performed simultaneously, without departing from the scope of the appended claims. It also should be understood that the illustrated method 700 can be ended at any time and need not be performed in its entirety. Some or all operations of the method 700, and/or substantially equivalent operations, can be performed by execution of computer-readable instructions included on a computer-storage media.

The method 700 begins at operation 702, wherein the NMS 202 authenticates a user. Authentication of a user is generally known and will not be described herein for the sake of brevity. The method 700 proceeds to operation 704, wherein the NMS 202 sets permissions for the user. The determination as to how to set the permissions for the user will be determined by a network operator and may be reflected by a preference, a database field entry, and/or a program setting accessible by the NMS 202. In some embodiments, the user is not authorized to control the NMS 202 and the NMS 202 therefore effectively sets no permissions. In some embodiments, the user is authorized to interact with certain systems of the network 100. Therefore, the NMS 202 sets the permissions such that the user is able to view and/or manage the certain systems of the network with which the user is authorized to interact. Depending upon a user's position, responsibilities, expertise, and/or needs, the NMS 202 may allow or disallow certain data to be viewed by a user. It should be understood, therefore, that many different configurations of viewable data are possible and that the data may be presented in any desired order and/or format.

The method 700 proceeds to operation 706, wherein the permitted data, i.e., the data the user is authorized to view and/or manage, is retrieved from the NMS 202 and/or other systems associated with the NMS 202. It should be understood that a web-based interface, for example a web server interacting with a browser or other graphical user interface (GUI) operating at the access device 204, may provide the data to a user in a viewable format. In some embodiments, a dynamic web page presents the authorized data as it is retrieved from a storage location. For example, a file written and/or scripted in HTML, PERL, JAVA, XML, ASP, ASP- .NET, CGI, other and/or similar languages, combinations thereof, and the like, may retrieve the desired data from a database using SQL and/or other database management commands. These embodiments are merely illustrative and should not be viewed as limiting the disclosure in any way.

The method 700 proceeds to operation 708, wherein the data is displayed for the user. For example, the retrieved data is presented for a user via the GUI of the access device 204 and is output on an I/O device 220, e.g. a display, of the access device 204. It should be understood that the data may be presented to the user in other ways, for example, by being printed in a tangible form for review by the user, by being transferred to the user via an electronic message such as an email, a text message, or another type of message, additional and/or alternative formats, and the like. Although not illustrated in FIG. 7, the user can interact with the NMS 202 to control certain functions, confirm identification of network faults, take corrective action, set permissions, combinations thereof, and the like. The method 700 ends.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
    gathering, at a network management system, network operational data, wherein gathering the network operational data comprises monitoring a network element executing a synthetic transaction to determine if the network element completes the synthetic transaction correctly;
    storing the network operational data at a storage location associated with the network management system;
    obtaining access control list data associated with the network element;
    comparing the access control list data to historical access control list data associated with the network element to determine if the access control list data and the historical access control list data are the same, the historical access control list data being stored at a data storage location associated with the network management system;
    determining if a network error exists, wherein the network error comprises a determination that the access control list data and the historical access control list data are not the same; and
    in response to determining that the network error exists, examining preferences and settings associated with the network management system to determine if the network management system is authorized to auto-correct the network error, in response to a determination that the network management system is not authorized to auto-correct the network error, generating an error ticket, and in response to a determination that the network management system is authorized to correct the network error, executing an action to correct the network error and generating a log entry indicating the action taken to correct the network error.

2. The method of claim 1, wherein gathering the network operational data further comprises:
    obtaining configuration data associated with a network element; and
    monitoring network traffic to obtain capacity data.

3. The method of claim 2, wherein:
    gathering the network operational data further comprises retrieving a network operation rule, the network operation rule defining a fault condition for the network element, the fault condition for the network element comprising the network error; and
    analyzing the network operational data comprises determining if the configuration data satisfies the rule, wherein the configuration data is determined to satisfy the rule if the configuration data indicates that the network element is operating in accordance with the fault condition.

4. The method of claim 3, further comprising:
    obtaining configuration data associated with a network element; and
    comparing the configuration data to historical configuration data associated with the network element to determine if the configuration data and the historical configuration data are the same, the historical configuration data being stored at a data storage location associated with the network management system, wherein the network error comprises a determination that the configuration data and the historical configuration data are not the same.

5. The method of claim 2, wherein:
    gathering the network operational data further comprises retrieving a network operation rule, the network operation rule defining a fault condition for the network element, the fault condition for the network element comprising the network error; and
    analyzing the network operational data comprises determining if the capacity data satisfies the rule, wherein the capacity data is determined to satisfy the rule if the capacity data indicates that the network element is operating at a capacity that violates a threshold defined by the rule.

6. The method of claim 1, wherein gathering the network operational data further comprises receiving an electronic message comprising a report relating to a network element of the network and parsing the electronic message to extract the report from the electronic message, and wherein determining that the network error exists comprises determining that the report corresponds to an error at the network element.

7. The method of claim 6, further comprising converting the report into an alarm recognizable by the network to indicate that the network error exists at the network element, and sending the alarm to the network.

8. The method of claim 1, wherein executing the action comprises generating a notification and displaying the notification to a user of the network management system.

9. The method of claim 1, further comprising:
    providing a web interface for controlling the network management system;
    authenticating a user at the web interface;
    setting permissions for the user based, at least in part, upon the authenticating;
    retrieving permitted data for the user; and
    displaying the permitted data for the user.

10. The method of claim 1, wherein gathering the operational data further comprises monitoring a real transaction conducted between a first network device residing on the network and a second network device communicating with the network to determine if the real transaction is completed correctly.

11. A system for managing a network, the system comprising:
a processor; and
a memory for storing computer executable instructions, the computer executable instructions comprising an alarm/alerting engine, an analysis engine, an inventory module, and a log file hypermining engine, the computer executable instructions being executable by the processor, wherein execution of the instructions by the processor causes the processor to perform operations comprising:
gathering, using the alarming/alerting engine, network operational data, wherein gathering the network operational data comprises monitoring a synthetic transaction conducted by a network element to determine if the synthetic transaction is completed correctly, and monitoring a real transaction conducted between a first network device residing on the network and a second network device communicating with the network to determine if the real transaction is completed correctly,
storing, at the inventory module, the network operational data,
obtaining access control list data associated with the network element,
comparing access control list data to historical access control list data associated with the network element to determine if the access control list data and the historical access control list data are the same, the historical access control list data being stored at a data storage location associated with the network management system,
identifying a network error by determining that the access control list data and the historical access control list data are not the same,
examining preferences and settings associated with the network management system to determine if the network management system is authorized to auto-correct the network error identified,
in response to a determination that the network management system is authorized to auto-correct the network error, executing an action to correct the network error and
creating an error log entry, the error log entry comprising data indicating the network error and the action executed to correct the network error.

12. The system of claim 11, wherein execution of the instructions by the processor causes the processor to perform the operations further comprising:
storing the log entry at the memory, the memory comprising a plurality of historical log entries, wherein each historical log entry comprises data indicating a historical network error and an action executed to correct the historical network error;
analyzing the log entry and the plurality of historical log entries to determine a historical trend indicating network behavior over time; and
generating a recommended network management rule based, at least partially, upon the historical trend and the network behavior.

13. The system of claim 11, wherein execution of the instructions by the processor causes the processor to perform the operations further comprising:
obtaining configuration data associated with a network element; and
comparing the configuration data to historical configuration data associated with the network element to determine if the configuration data and the historical configuration data are the same, the historical configuration data being stored at a data storage location associated with the network management system, wherein identifying the network error further comprises determining that the configuration data and the historical configuration data are not the same.

14. The system of claim 11, wherein the execution of the instructions by the processor causes the processor to perform the operations further comprising:
authenticating a user at the network management system;
setting permissions for the user based, at least in part, upon the authenticating;
retrieving permitted data for the user from the memory; and
displaying the permitted data for the user.

15. The system of claim 11, wherein identifying the network error further comprises determining that the synthetic transaction is not completed correctly.

16. A non-transitory computer storage medium having computer-executable instructions stored thereon that, when executed by a processor, cause the processor to perform operations comprising:
gathering, at a network management system, network operational data, wherein gathering the network operational data comprises monitoring a synthetic transaction conducted by a network element to determine if the synthetic transaction is completed correctly, and monitoring a real transaction conducted between a first network device residing on the network and a second network device communicating with the network to determine if the real transaction is completed correctly;
storing the network operational data at a storage location associated with the network management system;
obtaining access control list data associated with the network element;
comparing access control list data to historical access control list data associated with the network element to determine if the access control list data and the historical access control list data are the same, the historical access control list data being stored at a data storage location associated with the network management system;
identifying a network error by determining that the access control list data and the historical access control list data are not the same;
examining preferences and settings associated with the network management system to determine if the network management system is authorized to auto-correct the network error;
in response to determining that the network management system is authorized to auto-correct the network error, executing an action to correct the network error;
in response to determining that the network management system is not configured to auto-correct the network error, generating an error ticket for correction of the network error; and
creating an error log entry, the error log entry comprising data indicating the network error and the action executed to correct the network error.

17. The non-transitory computer storage medium of claim 16, wherein identifying the network error further comprises determining that the synthetic transaction is not completed correctly.

* * * * *